(12) United States Patent
Martinon

(10) Patent No.: US 11,725,676 B2
(45) Date of Patent: Aug. 15, 2023

(54) COLLAR FOR TELESCOPIC CYLINDER FOR TIPPER VEHICLES AND TELESCOPIC CYLINDER WITH SUCH A COLLAR

(71) Applicant: BINOTTO—S.R.L., Dueville (IT)

(72) Inventor: Giuseppe Martinon, Cittadella (IT)

(73) Assignee: BINOTTO—S.R.L., Dueville (IT)

( * ) Notice: Subject to any disclaimer, the term of this patent is extended or adjusted under 35 U.S.C. 154(b) by 0 days.

(21) Appl. No.: 18/052,336

(22) Filed: Nov. 3, 2022

(65) Prior Publication Data
US 2023/0204054 A1 Jun. 29, 2023

(30) Foreign Application Priority Data
Dec. 23, 2021 (IT) .......................... 102021000032372

(51) Int. Cl.
*F15B 15/16* (2006.01)
*B60P 1/16* (2006.01)

(52) U.S. Cl.
CPC .............. *F15B 15/16* (2013.01); *B60P 1/162* (2013.01)

(58) Field of Classification Search
CPC ................................ F15B 15/16; B60P 1/162
See application file for complete search history.

(56) References Cited

U.S. PATENT DOCUMENTS 6,938,538 B1 * 9/2005 Mainville ............ F16J 15/3204
92/253

FOREIGN PATENT DOCUMENTS

| CA | 2415982 | A1 | 7/2004 | | |
|----|---------|----|--------|---|---|
| CN | 102032234 | A | 4/2011 | | |
| CN | 102252005 | A | 11/2011 | | |
| CN | 213511473 | U | 6/2021 | | |
| GB | 561383 | A | 5/1944 | | |
| GB | 2117448 | | * 10/1983 | .............. | F15B 15/28 |
| GB | 2243344 | | * 10/1991 | .............. | B60P 1/162 |

OTHER PUBLICATIONS

IT Search Report dated Aug. 19, 2022 re: Application No. 202100032372, pp. 1-9, citing: CN 213 511 573 U, GB 561 383 A, CA 2 415 982 A1, CN 102 032 234 A, CN 102 252 005 A.

* cited by examiner

*Primary Examiner* — Dustin T Nguyen
(74) *Attorney, Agent, or Firm* — Cantor Colburn LLP

(57) ABSTRACT

A collar for a telescopic cylinder with a cap includes the terminal portion of the cap that presents the opening of the cap, such that the collar includes in the following order a first annular element with a contoured profile, which surrounds the terminal portion and is welded thereto, and a second annular element, which can move with respect to the terminal portion and to the first annular element. The collar further includes an O-ring, made of rubber, surrounding the terminal portion and a third annular element surrounding the terminal portion and welded thereto. The first annular element has, at its internal circumference, an annular guide with a curved internal circumferential surface, the internal circumferential surface having, at each point of its circumference, a vertical cross-section with a shape that is concave as it progresses toward the outside of the collar.

8 Claims, 5 Drawing Sheets

US 11,725,676 B2

COLLAR FOR TELESCOPIC CYLINDER FOR TIPPER VEHICLES AND TELESCOPIC CYLINDER WITH SUCH A COLLAR

CROSS REFERENCE TO RELATED APPLICATIONS

This application claims priority to Italian Patent Application No. 102021000032372, filed on Dec. 23, 2021, the contents of which are hereby incorporated by reference in their entirety.

TECHNICAL FIELD

The present disclosure relates to a collar for a telescopic cylinder, for tipper vehicles, particularly for those of the oil pressure-controlled type.

The disclosure also relates to a telescopic cylinder with such a collar.

The disclosure can be applied in an industrial context, in the sector of tipper vehicles and/or of vehicles with tipping semitrailers, provided with a power chassis and a semitrailer.

BACKGROUND

Nowadays tipper vehicles are widespread and widely used, and are constituted substantially by a truck with a chassis on which the following are mounted:
a driver's cab,
a body that can be tipped in order to make the contents exit, to the rear of the driver's cab.

Such body is normally hinged at one end of the chassis, opposite to the end that supports the driver's cab.

In order to move the body and perform the (partial) tipping thereof, an oil pressure-operated telescopic cylinder is generally used.

The telescopic cylinder has a telescopic shaft comprising a plurality of tubular portions which can slide, each inside a subsequent portion, and which are known in the trade as "stages".

Such telescopic cylinder is arranged to operate:
either below the body, in a substantially central position of the chassis of the truck,
or at the end of the body, proximate to the driver's cab of the truck.

Taking telescopic cylinders that act at the end of the body proximate the driver's cab, these are coupled:
at a first end, lower and fixed with respect to the chassis of the truck, to the chassis itself,
at a second end, opposite to the first end, higher and movable with respect to the chassis of the truck, to the external surface of the wall of the body proximate to the driver's cab of the truck.

In the present description, the terms "upper", "lower", "above", "below", etc. refer to the active configuration of the telescopic cylinder.

Similarly, in the present description, the terms "internal", "inner", "external", "outer" or the like refer to the active configuration of the cylinder and/or of the collar, and, in particular, the terms "internal", "inner" etc. refer to the direction substantially directed toward the axis of extension of the cylinder, while the terms "external", "outer" etc. refer to the direction substantially opposite to the previous one.

The body of the truck is substantially basin-shaped and the wall proximate to the driver's cab, in the configuration of movement of the vehicle, can be:

substantially perpendicular to the plane of advancement of the vehicle,
inclined with respect to the plane of advancement of the vehicle.

Usually, at its lower end the telescopic cylinder has means for pivoting to the truck, which comprise a slot for inserting a coupling pin and/or one or more pins adapted to be inserted in corresponding slots of the chassis of the truck.

According to the type of wall of the body to which it is to be pivoted, the oil pressure-controlled cylinder is provided, at its upper end, alternatively, with:
a slot for inserting a coupling pin, for use on walls that are inclined with respect to the plane of advancement of the truck,
a terminal cap, cylindrical and tubular in shape, with at least two opposing and coaxial pins, which extend from a collar arranged at the lower end of the cap and are adapted to be inserted into corresponding slots of the wall of the body, for use on walls that are substantially at right angles to the plane of advancement of the truck during movement.

Taking the cylinder with the terminal cap, this can be mounted, alternatively:
substantially vertically, with its axis of extension perpendicular to the plane of advancement of the truck,
inclined, with its axis of extension inclined with respect to the plane of advancement of the truck, and with the terminal cap fixed to the wall of the body, in the direction of the driver's cab.

As illustrated above, the cap of such a cylinder has at its lower end a collar, which is constituted, in order, by:
a first annular element, with a contoured profile, which surrounds the jacket of the cap at its open end, and is welded thereto,
a movable second annular element from which the pins for associating with the body extend, which surrounds the first annular element and the portion of jacket of the cap adjacent thereto; this movable second annular element has an internal annular surface that is shaped to at least partially match the first annular element and is complementary thereto, and is at least partially slideable/tiltable with respect to the said and to the jacket of the cap,
an O-ring, made of rubber, surrounding the jacket of the cap and interposed between the movable second annular element and a fixed third annular element, and interacting with both,
such third annular element, which surrounds the jacket of the cap and is welded thereto.

In particular, the first annular element has an outer annular surface that is substantially flared, with its maximum circumference at the lower end of the jacket of the cap.

During use, the configuration of the collar enables the second annular element, coupled to the body, to follow/support the movement thereof, so accompanying any minimal lateral inclinations that should occur, also taking advantage of the compression of the O-ring and so preventing damaging side loads on the cylinder which could, over time, damage it.

Such known art has a number of drawbacks.

In fact, even if such a collar is configured to accompany any minimal lateral inclinations, in some operating conditions such as, for example, on some types of terrain and/or as a consequence of jolts of the chassis and/or owing to incorrectly associating the rear portion of the body with the chassis of the truck and/or owing to practices of operators that do not observe the rules of correct use of the tipper vehicle and of its hydraulic system, inclinations/twists can be generated that are greater than those that can normally be absorbed by a conventional collar, like the one described above.

This determines the development of considerable side loads on the cylinder, with a consequent side load on the cylinder that can damage it and cause it to break.

Furthermore, the excessive side load causes a misalignment between the cap and one or more of the elements of the shaft, resulting in the former colliding with the latter, thus generating seizures thereon.

In order to limit this type of problem, some makers provide caps with a larger inside diameter, in order to space the cap apart from the telescopic shaft.

However, this solution has other drawbacks, which include:
greater weight, with associated greater energy consumption for the movement thereof,
greater bulk, which causes difficulties in associating it with the body,
higher cost.

Another solution found on the market has an annular guide fitted internally in the cap, but such annular guide, while it is capable of preventing misalignments between the shaft and the cap when the cylinder is closed, for example, when the vehicle is in motion with empty body, is not capable of preventing them with the cylinder extended.

The aim of the present disclosure is to provide a collar for a telescopic cylinder for tipper vehicles and a telescopic cylinder with such a collar that are capable of improving the known art in one or more of the above-mentioned aspects.

Within this aim, the disclosure provides a collar for a telescopic cylinder for tipper vehicles and a telescopic cylinder with such a collar that make it possible to minimize the consequences of collisions between cap and shaft in the event of misalignment between the two, thus preventing the generation of seizures or breakages on the shaft.

the disclosure also provides a collar for a telescopic cylinder for tipper vehicles that facilitates the retraction of the cap when the shaft is being closed and the alignment thereof with the latter.

The disclosure further provides a collar for a telescopic cylinder for tipper vehicles and a cylinder with such a collar, which in the event of impact between cap and shaft, owing to a side load, preserve the integrity of the shaft.

The present disclosure overcomes the drawbacks of the background art in a manner that is alternative to any existing solutions.

The disclosure also provides a telescopic cylinder for tipper vehicles and a cylinder with such a collar that are highly reliable, easy to implement and of low cost.

This aim and these and other advantages which will become better apparent hereinafter are achieved by providing a collar for a telescopic cylinder with a cap, said cap comprising a terminal portion that presents an opening of said cap, said collar comprising, in the following order:
a first annular element with a contoured profile, which surrounds said terminal portion and is welded thereto,
a second annular element, which can move with respect to said terminal portion and to said first annular element, said second annular element having at least two pins which extend at right angles to its external surface, said second annular element surrounding at least partially said first annular element and said terminal portion, said second annular element being in contact with said first annular element,
an O-ring, made of rubber, surrounding said terminal portion and interposed between said second annular element and a fixed third annular element, and interacting with both,
said third annular element surrounding said terminal portion and welded thereto,
wherein said first annular element has, at an internal circumference thereof, an annular guide with a curved internal circumferential surface, said internal circumferential surface having, at each point of its circumference, a vertical cross-section with a shape that is concave as it progresses toward an outside of said collar.

This aim and these and other advantages which will become better apparent hereinafter are achieved by a cylinder with such a collar.

BRIEF DESCRIPTION OF THE DRAWINGS

Further characteristics and advantages of the disclosure will become better apparent from the detailed description that follows of a preferred, but not exclusive, embodiment of the telescopic cylinder for tipper vehicles and of the cylinder with such a collar, according to the disclosure, which is illustrated for the purposes of non-limiting example in the accompanying drawings wherein.

DETAILED DESCRIPTION OF THE DRAWINGS

Figure 1:
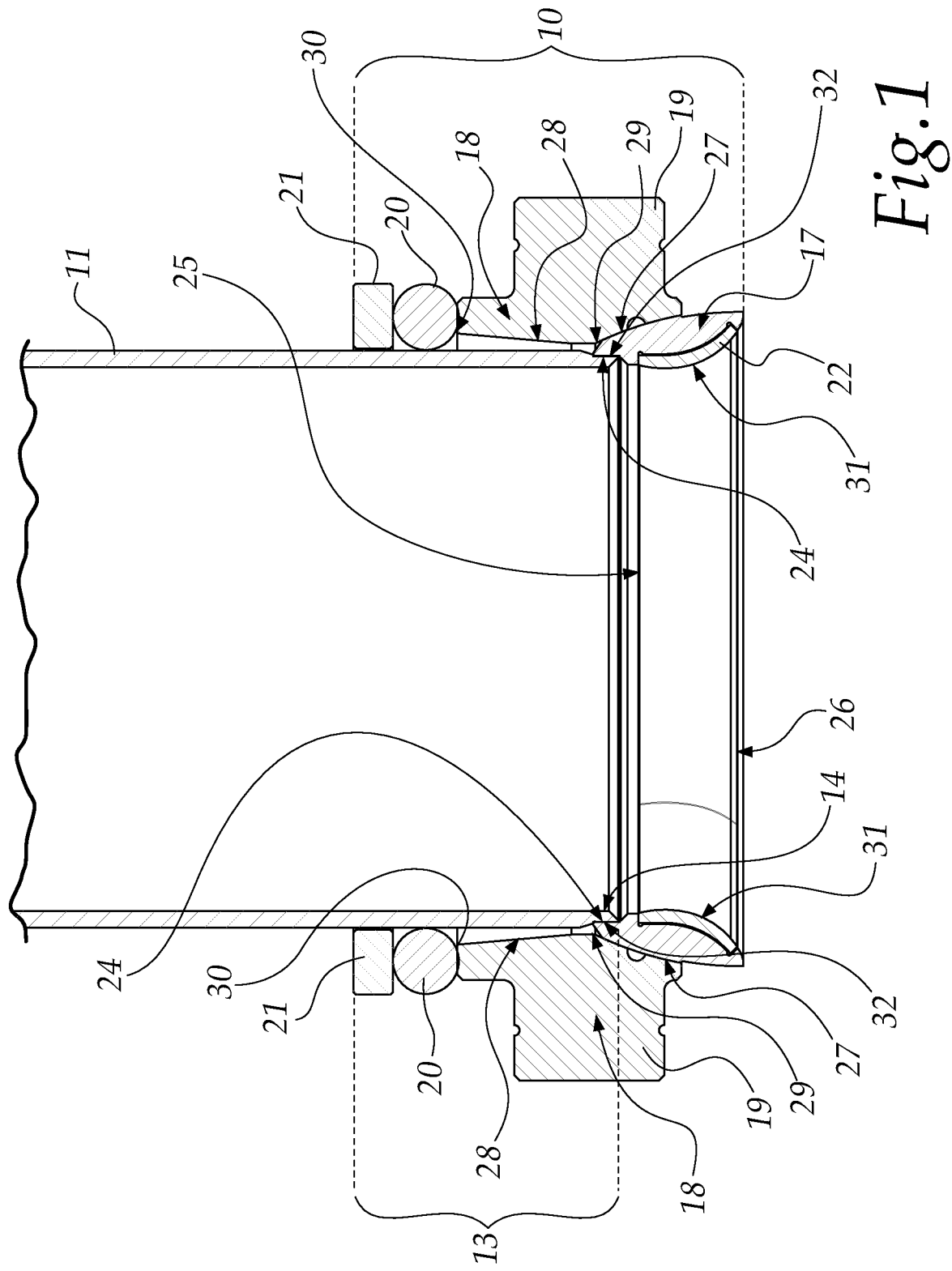
FIG. 1 is a partial cross-sectional view of a detail of a collar for an oil pressure-operated telescopic cylinder for tipper vehicles, according to the disclosure.

With reference to the figures, a collar for a telescopic cylinder for tipper vehicles, according to the disclosure, is generally designated by the reference numeral 10.

The collar 10 is associated with the cap 11 of a telescopic cylinder 12, which is oil pressure-operated.

The collar 10 comprises the terminal portion 13 of the cap 11, which presents the opening 14 of the cap 11.

The opening 14 allows the egress of the tubular portions 15 of the telescopic shaft 16 of the cylinder 12, during the extension thereof.

Such collar 10 comprises, in order:
a first annular element 17 with a contoured profile, which surrounds the terminal portion 13 and is welded thereto,
a second annular element 18, which can move with respect to the terminal portion 13 and to the first annular element 17, and which has at least two pins 19 which extend at right angles to its external surface, such second annular element 18 surrounding at least partially the first annular element 17 and the terminal portion 13 of the cap 11 and being in contact with the first annular element 17,
an O-ring 20, made of rubber, surrounding the terminal portion 13 of the cap 11 and interposed between the second annular element 18 and a fixed third annular element 21, and interacting with both, such third annular element 21 surrounding the terminal portion 13 of the cap 11 and welded thereto.

Figure 2:
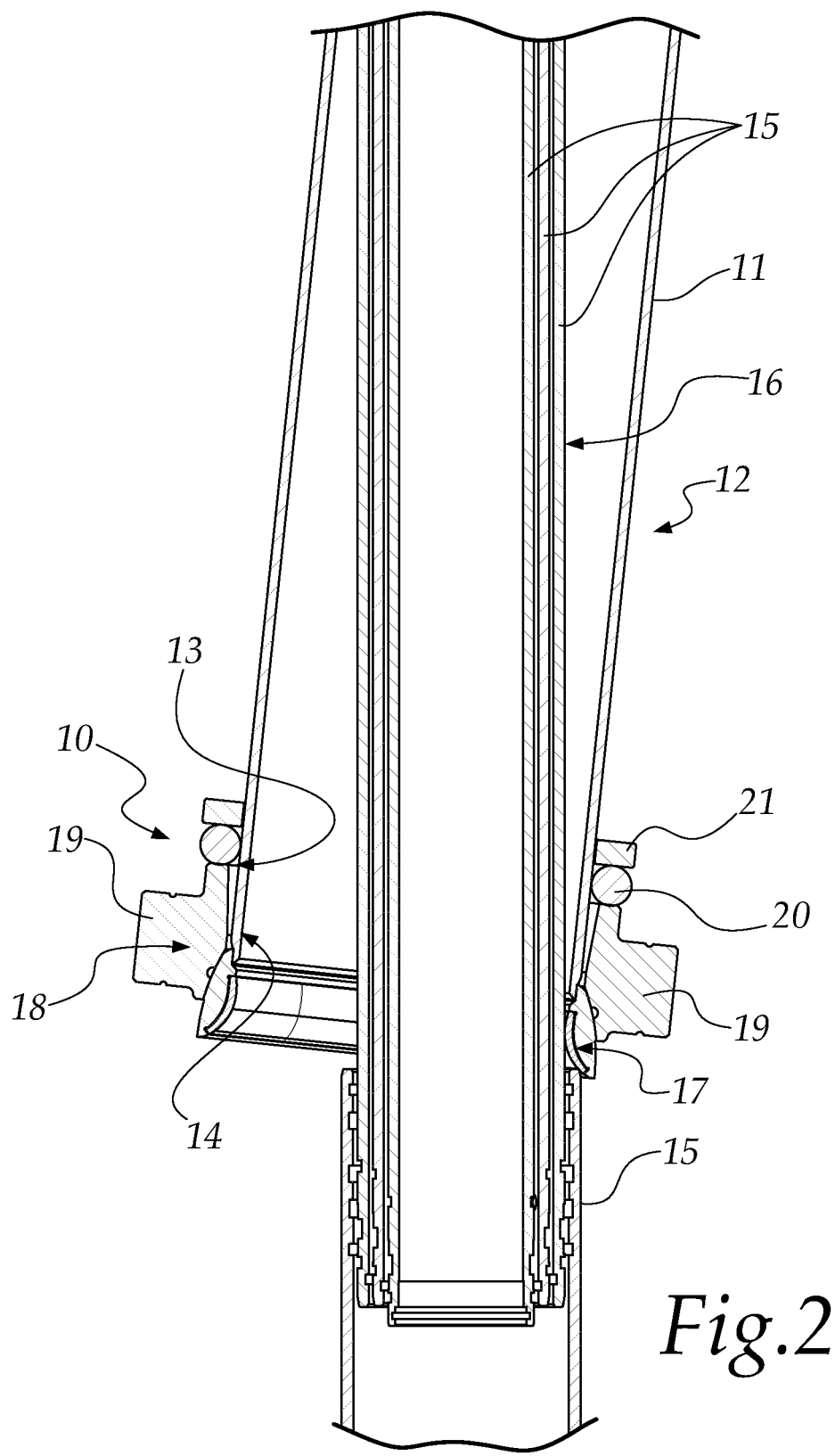
FIG. 2 is a partial cross-sectional view of a telescopic cylinder, according to the disclosure, in a first configuration of use.
Figure 2A:
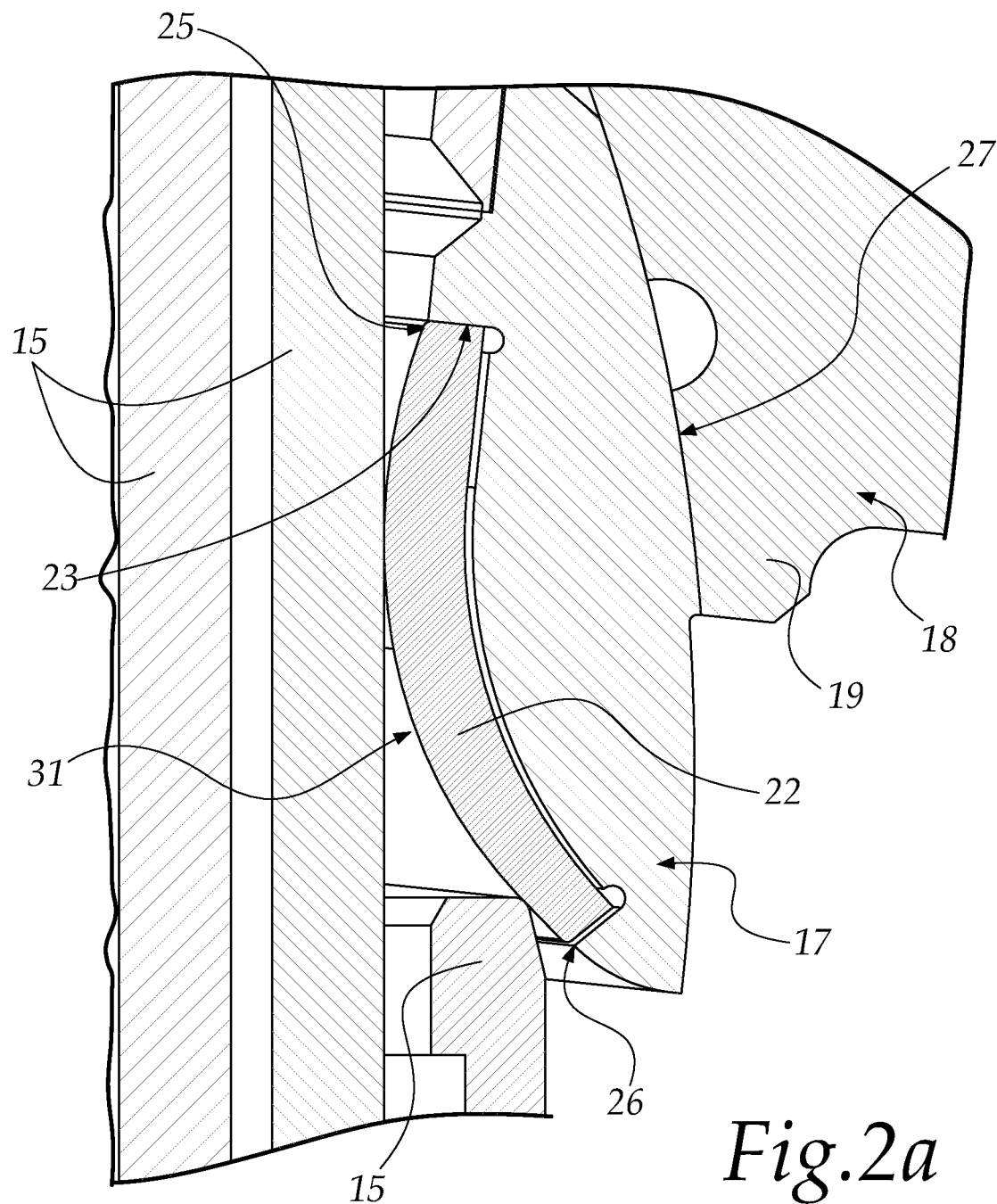
FIG. 2a is an enlarged detail of the cross-section of FIG. 2.
Figure 3:
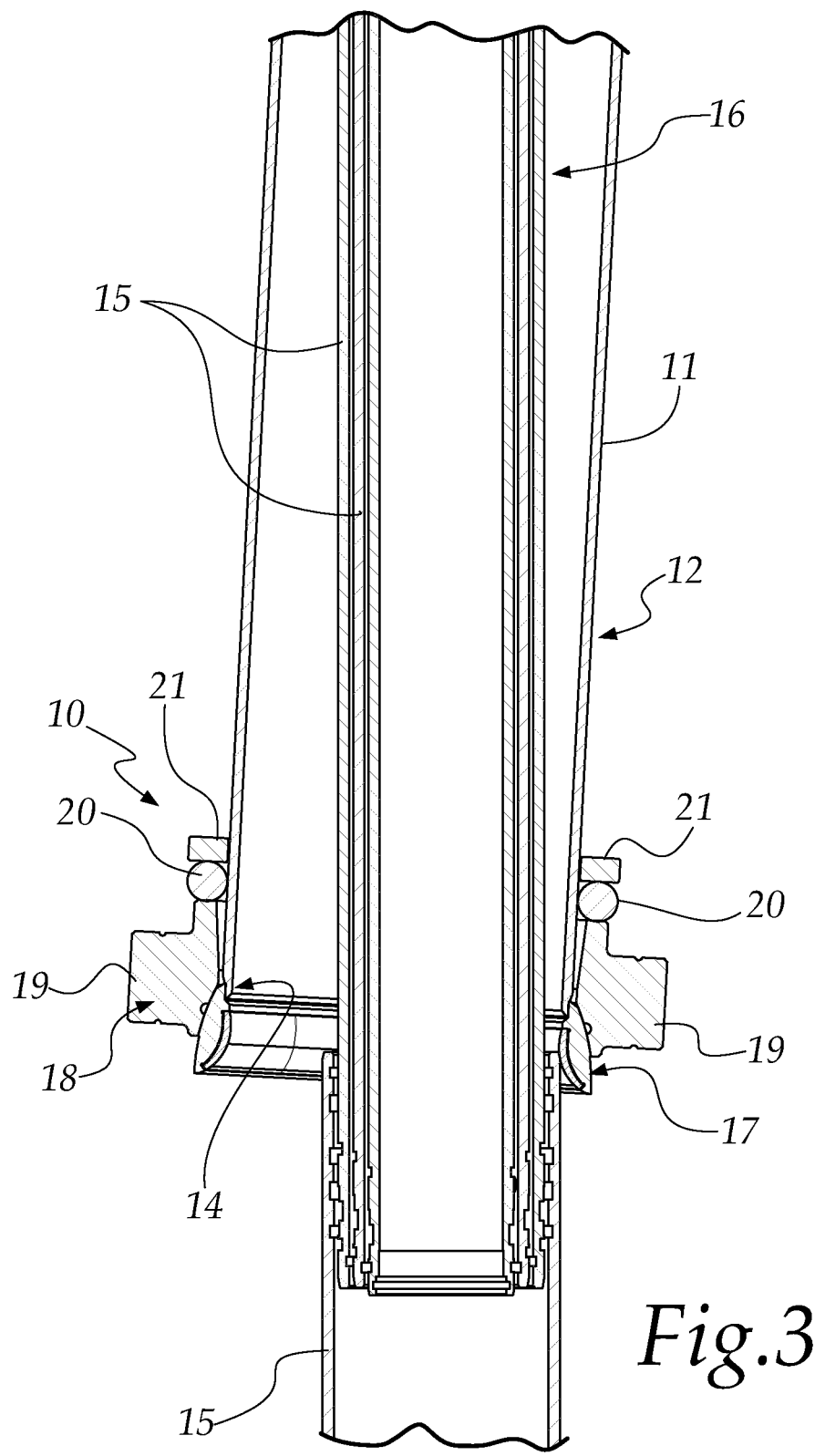
FIG. 3 is a partial cross-sectional view of a telescopic cylinder, according to the disclosure, in a second configuration of use.
Figure 3A:
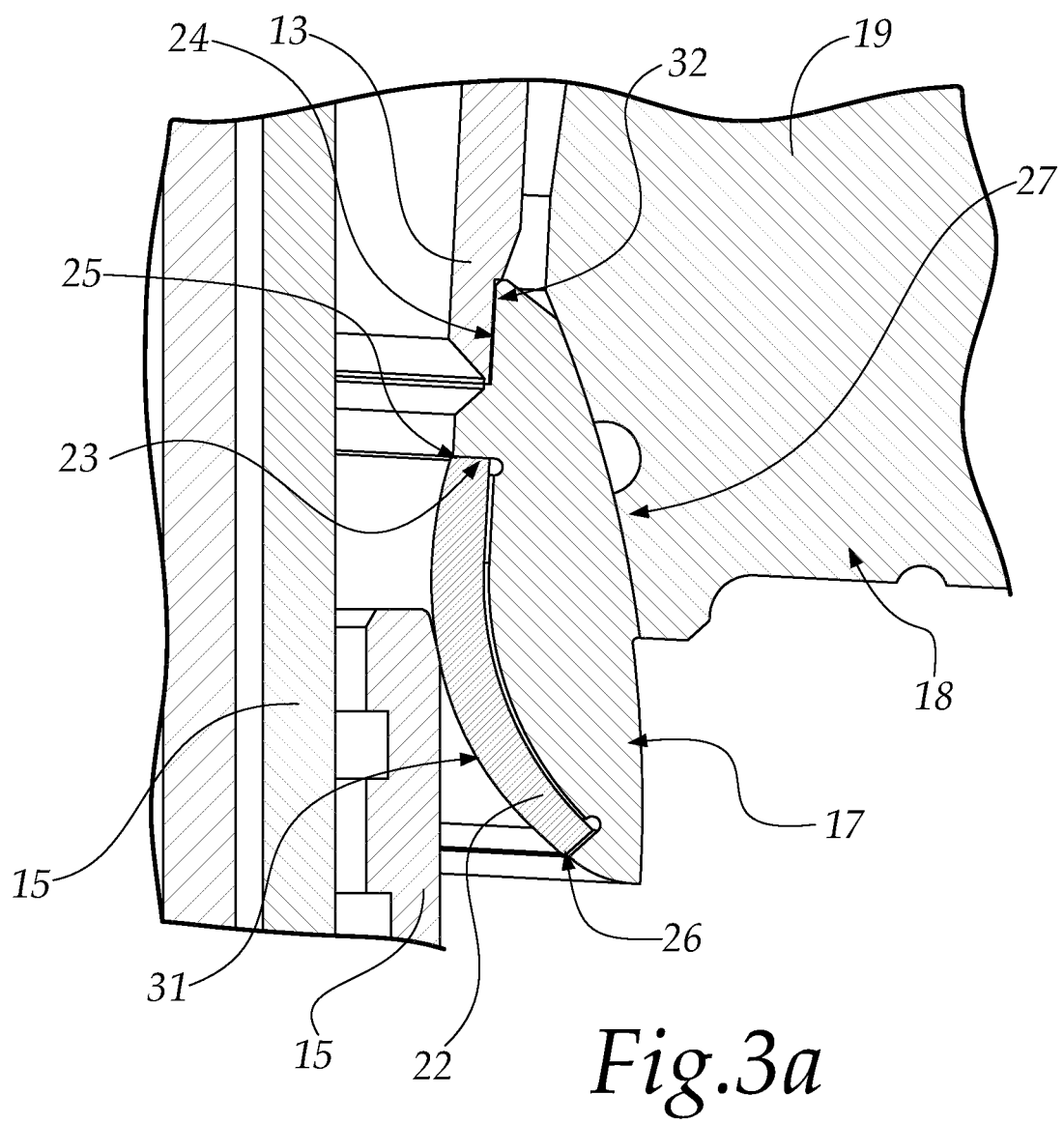
FIG. 3a is an enlarged detail of the cross-section of FIG. 3.

One of the peculiarities of the disclosure is that the first annular element 17 has, at its internal circumference, an annular guide 22 with a curved internal circumferential surface 31, which has, at each point of its circumference, a vertical cross-section with a shape that is concave as it progresses toward the outside of the collar 10, as can clearly be seen in FIGS. 2a and 3a.

In particular, the annular guide 22 is made of plastic material such as, for example, a copolymer of polyoxymethylene, known by the commercial name of "Hostaform", made by the Celanese Corporation located in Irving, Tex., loaded with molybdenum sulfide ($MoS_2$).

It should be noted that, in the event of misalignment between the cap 11 and the shaft 16, such an annular guide 22 with a rounded profile prevents the formation of seizing/breakage as a consequence of collision between the two.

Furthermore, such an annular guide 22 facilitates the return to axial alignment of the cap 11 with the shaft 16, when being closed, as schematically represented in the transition from the configuration of FIGS. 2 and 2a, to the configuration of FIGS. 3 and 3a.

The first annular element 17 is provided with a seat 23 for the accommodation of the annular guide 22, which is shaped complementarily thereto and provides a substantially uniform surface therewith.

In particular, the first annular element 17 is welded at its upper end 32 to the jacket of the cap 11 and, in particular, to the lower end 24 of its terminal portion 13.

With particular reference to FIG. 1, the annular guide 22 is shaped/configured so as to have an internal circumference that substantially increases between:

its upper end 25, in which the circumference is substantially equal to the internal circumference of the cap 11, its lower end 26, in which the circumference is greater than the internal circumference of the cap 11.

It should be noted that such an annular guide, in the event of a particularly intense impact between the cap 11 and the shaft 16, can break, in so doing preserving the shaft 16.

In the event of breakage it is sufficient to replace it in order to restore the cylinder 12 to operability, and it is not necessary to replace the collar or indeed the entire cylinder as occurs with the use of conventional cylinders.

It should also be noted that such a damaged or broken annular guide can be an indicator of improper or incorrect use of the cylinder by the operator.

The second annular element 18 is shaped so as to have an internal circumferential surface subdivided into:

a first section 27, which is shaped complementarily to the first annular element 17 and is in contact with it, a second section 28, the internal circumference of which substantially increases between:

its lower end 29, proximate to/at the first annular element 17, in which the circumference is substantially comparable with the external circumference of the cap 11, its upper end 30, in which the circumference is greater than the circumference at its lower end 29.

Such configuration of the second annular element 18 allows, in the event of side loads, a certain play with respect to the cap 11 and therefore a movement discharging the stress absorbed by the O-ring 20, placed above the second annular element 18 by virtue of its compression.

In practice it has been found that the disclosure fully achieves the intended aim and objects by providing a collar for a telescopic cylinder for tipper vehicles, and a telescopic cylinder with such a collar, that make it possible to minimize the consequences of collisions between cap and shaft in the event of misalignment between the two, thus preventing the generation of seizures or breakages on the shaft.

With the disclosure a collar for a telescopic cylinder for tipper vehicles has been provided that facilitates the retraction of the cap when the shaft is being closed and the alignment thereof with the latter.

With the disclosure a collar for a telescopic cylinder for tipper vehicles and a cylinder with such a collar have been provided which, in the event of impact between cap and shaft, owing to a side load, preserve the integrity of the shaft.

The disclosure thus conceived is susceptible of numerous modifications and variations, all of which are within the scope of the appended claims. Moreover, all the details may be substituted by other, technically equivalent elements.

In practice the materials employed, provided they are compatible with the specific use, and the contingent dimensions and shapes, may be any according to requirements and to the state of the art.

What is claimed is:

1. A collar for a telescopic cylinder with a cap, said cap comprising a terminal portion that presents an opening of said cap, said collar comprising, in the following order:

a first annular element with a contoured profile, which surrounds said terminal portion and is welded thereto, a second annular element, which can move with respect to said terminal portion and to said first annular element, said second annular element having at least two pins which extend at right angles to an external surface thereof, said second annular element surrounding at least partially said first annular element and said terminal portion, said second annular element being in contact with said first annular element, and an O-ring, made of rubber, surrounding said terminal portion and interposed between said second annular element and a fixed third annular element, and interacting with both, said third annular element surrounding said terminal portion and welded thereto, wherein said first annular element has, at an internal circumference thereof, an annular guide with a curved internal circumferential surface, said curved internal circumferential surface having, at each point of its circumference, a vertical cross-section with a shape that is concave as it progresses toward an outside of said collar.

2. The collar according to claim 1, wherein said annular guide is made of plastic material.

3. The collar according to claim 1, wherein said first annular element is provided with a seat configured for accommodating said annular guide which is shaped complementarily thereto, said first annular element providing, with said annular guide, a substantially uniform surface.

4. The collar according to claim 1, wherein said first annular element is welded, at an upper end thereof, to a lower end of said terminal portion.

5. The collar according to claim 1, wherein said annular guide is shaped to have the curved internal circumference that substantially increases between:

an upper end thereof, in which the curved internal circumference is substantially equal to the internal circumference of said cap, and a lower end thereof in which the curved internal circumference is greater than the internal circumference of said cap.

6. The collar according to claim 1, wherein said second annular element is shaped so as to have an internal circumferential surface subdivided into:
- a first section, which is shaped complementarily to said first annular element and is in contact with said annular element, and
- a second section, an internal circumference of which substantially increases between:
- a lower end, proximate to/at said first annular element, in which the internal circumference is substantially comparable with the external circumference of said cap, and
- an upper end, in which the internal circumference is greater than the internal circumference at its lower end.

7. A telescopic cylinder for tipper vehicles, comprising a collar according to claim 1.

8. The cylinder according to claim 7, wherein the cylinder is oil pressure-controlled.

* * * * *